Jan. 5, 1971     T. L. COCHRAN     3,552,098

AIR FILTER CONTROL ARRANGEMENT

Filed July 12, 1968     2 Sheets-Sheet 1

INVENTOR.
THOMAS L. COCHRAN
BY Edward M. Steuerman
ATTORNEY

INVENTOR.
THOMAS L. COCHRAN

BY Edward M. Steuterman

ATTORNEY

United States Patent Office 3,552,098
Patented Jan. 5, 1971

3,552,098
AIR FILTER CONTROL ARRANGEMENT
Thomas L. Cochran, Davenport, Iowa, assignor to American Air Filter Company, Inc., Louisville, Ky., a corporation of Delaware
Filed July 12, 1968, Ser. No. 744,546
Int. Cl. B01d 46/18
U.S. Cl. 55—274                                                    4 Claims

ABSTRACT OF THE DISCLOSURE

Apparatus to indicate the condition of air filter media in an air flow conduit and to control the replacement of such air filter media which includes means sensitive to change in differential air pressure between the upstream and downstream side of the media to indicate the condition of the media, media advance control means to advance a selected length of new media into the air flow stream, and switch means inter-connected with the filter media advance means to terminate air flow through the conduit when the filter media is changed so there is no differential pressure across the media and the differential pressure sensing means is reset.

BACKGROUND OF THE INVENTION

Previous air handling units have provided various control arrangements responsive to the condition of filter media to indicate when replacement media is needed. One such arrangement has included cooperative light transmitting and light receiving means to measure the decrease in light transmission through the media caused by accumulation of dirt on the media. Other arrangements have included timer means to periodically advance a selected quantity of media into the flow conduit regardless of the condition of the media but in applications where the quantity of particulate matter carried by the air stream varies from time to time, such an arrangement is insensitive to actual accumulation of dirt on the filter media and is not satisfactory in many such applications.

Some air filter arrangements have provided means to control the advance of new media into an air flow conduit in response to a change in differential pressure across the filter media but in most such apparatus it is intended to maintain the differential pressure within a very narrow range by introducing new media into the air filtering zone until there is a selected decrease in the differential pressure indicating the media has been replaced. Since there is only a very slight decrease in differential pressure when new media is introduced into the conduit very sensitive instruments are needed to measure the change in differential pressure and instruments with sufficient sensitivity to operate in such applications are extremely complex, expensive, and generally, require a great deal of maintenance. While such apparatus can be used in certain applications it is prohibited in other applications, such as ordinary air conditioning applications, where cost is a primary consideration.

SUMMARY OF THE INVENTION

The present invention provides a straightforward, inexpensive apparatus for indicating the condition of filter media disposed in filtering relation in a conduit which carries an air stream and likewise provides means for controlling the quantity of new filter media introduced into the air filtering zone as well as means for indicating when the selected filter media change has been accomplished.

The present invention likewise provides an arrangement which includes a straightforward inexpensive differential pressure sensing means to indicate the condition of the filter media which operates over a wide differential pressure range so that an extremely sensitive sensing means is not required.

Various other features of the present invention will become obvious to those skilled in the art upon reading the disclosure set forth hereinafter.

More particularly, in an air handling unit having cooperative fan means to provide flow of air through a conduit, means to retain filter media in air filtering relation in an air filtering zone in the conduit, clean filter media supply means and dirty filter media takeup means, the present invention provides a filter media indicator and media advance control arrangement comprising: differential pressure sensing means communicating with the air stream flowing through the conduit and sensitive to the change in differential pressure between the upstream and downstream side of the filter media; pressure differential indicator means operable by the pressure sensing means in response to selected increase in differential air pressure across the filter media; means to advance filter media from the filter media supply roll into the air filtering zone and advance filter media from the air filtering zone to the filter media takeup means; means to terminate operation of the fan means in response to advance of a first preselected length of filter media through the filtering zone; means to reset the indicator means in response to selected decrease in differential pressure between the upstream and downstream side of the filter media; and, means to initiate operation of the fan means in response to advance of a second preselected length of filter media through the filtering zone.

It is to be understood that the example of the present invention given hereinafter is not by way of limitation and that various changes can be made in the arrangement, form, or configuration of the apparatus disclosed without departing from the scope or spirit of the present invention.

Referring to the figures.

Figure 1:
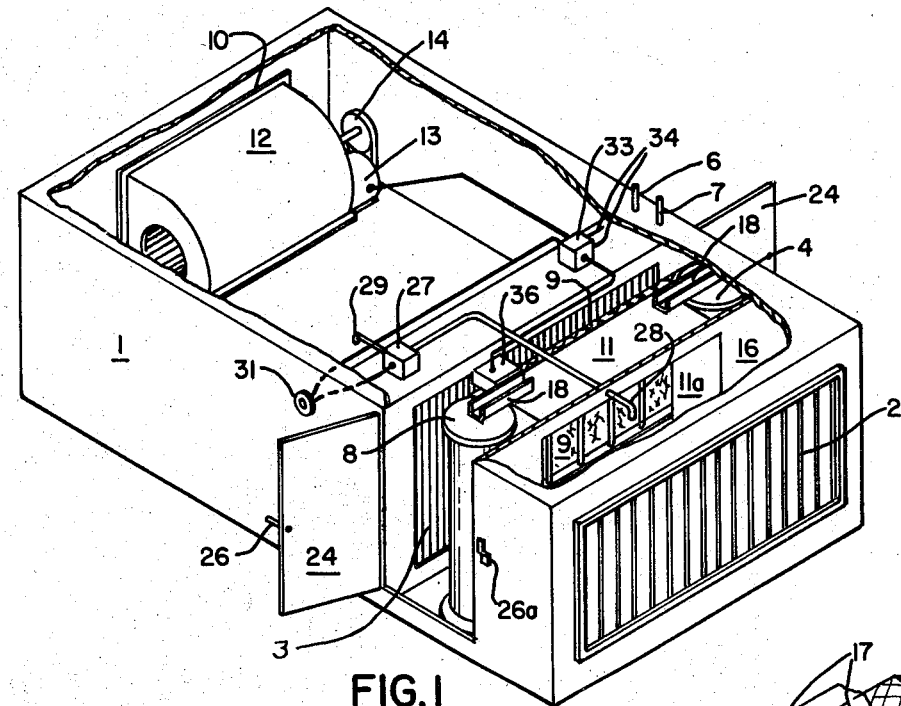
FIG. 1 is a schematic view, in section, of an air conditioning unit with an air filter condition indicating means and a filter media advance control arrangement in accordance with the present invention.

The air handling unit illustrated in FIG. 1 includes a housing 1 having an air inlet grill 2 with a heat transfer coil 3 downstream of the air inlet and adapted to receive a tempering fluid to selectively heat or cool the air stream flowing through the air conditioning apparatus. An air filter holding frame 11 is disposed between inlet grill 2 and coil 3 and includes means to retain a filter web 9 in air filtering relation to remove particulate matter carried by the air stream flowing through housing 1.

Various means can be provided to supply filter media to the filter frame and in the example of the figures a roll of new filter media 4 and a media takeup roll 8 are disposed on opposite sides of the air filter frame 11, as shown. Frame 11, as hereinafter described, can be disposed transversely across housing 1 and includes means, also hereinafter described, to retain the filter media 9 in air filtering relation.

In the example shown, an induced draft blower 12 is disposed adjacent the outlet (not shown) of casing 1 and a seal member 10 can be provided to fasten the blower to the outlet. The blower is driven, for example by motor 13 and pulley arrangement 14 as shown, so air is drawn through housing 1 from inlet grill 2 to be filtered and heated or cooled and the air stream is then emitted from the housing through the outlet.

A wall panel 16 is disposed transversely across housing 1 and has an aperture in aligned communicative relation with air flow frame 11 so the air flowing through the housing passes through the frame 11 to be directed through air filter media 9 disposed across the outlet of frame 11.

Figure 2:
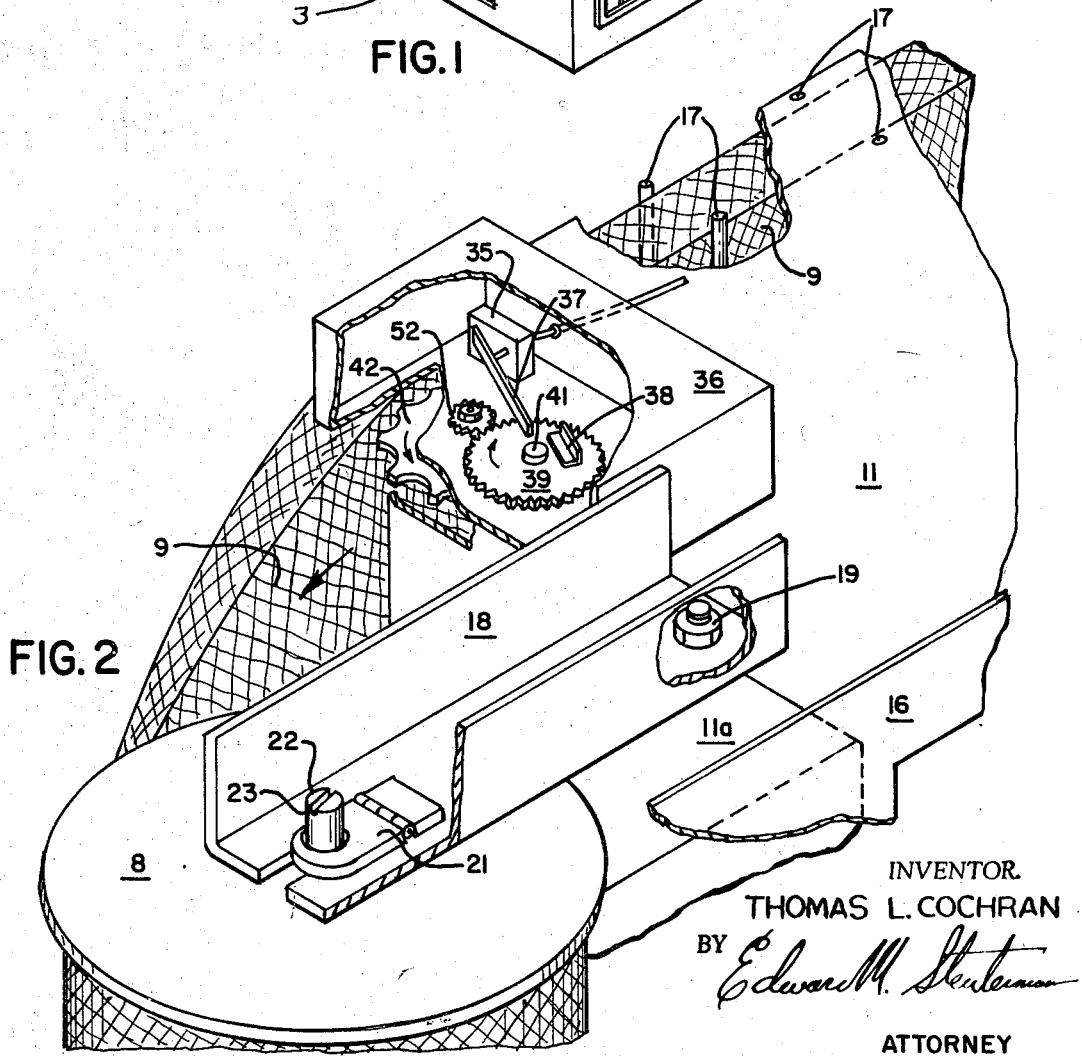
FIG. 2 is an enlarged detailed view of one example of an air filter advance control mechanism in accordance with the present invention.

Panel 16 is disposed with relation to frame 11 to define recesses on opposite sides of air flow frame 11 to receive filter media supply roll 4 and filter media takeup roll 8, respectively. As hereinbefore described, a web of filter media 9, for example glass fiber, is disposed across the outlet of frame 11 and support means, for example bars 17 as shown in FIG. 2, are provided in frame 11 to retain filter media in air filtering relation so all of the air flowing through the housing passes through the media web 9 before the air is heated or cooled in coil 3.

Journal means 21 are provided at opposite ends of media rolls 4 and 8 to retain the rolls in selected position and in the example of the figures cooperative channel members 18 are provided to hold the journal means. As shown, each channel member can be bolted to conduit 11 by means of cooperative bolt and nut assemblies 19. In the example shown a spindle 22 projects outwardly from each end of the media roll to be releasably received by journal 21 of channel member 18 and each journal assembly 21 (FIG. 2) provides a pivoted hinge member having a cooperative aperture to receive the spindle 22.

Filter media web 9 is advanced through the air filtering zone from supply roll 4 to takeup roll 8 by rotating takeup roll 8. In the example of the figures, each spindle 22 can include notch 23 to receive a crank (not shown) which can be turned automatically or manually to rotate takeup roll 8.

Rolls of media are released by lifting the hinged portion of journal 21 to release spindle 22 and the roll of media. The media rolls are removed from housing 1 by means of doors 24 which can include latch 26 to engage catch 26a to lock the doors in closed position when the air conditioning apparatus is in operation.

A power supply terminal box 33 included in the housing 1 is connected to power supply 34 to provide power to various elements of the apparatus as hereinafter described.

The example of the filter media indicator means and media advance control means in accordance with the present invention shown in the figures includes a differential pressure sensitive switch 27 having an upstream pressure sensing means, for example a tube 28 communicating with switch 27, to sense air pressure in the inlet chamber and a downstream pressure sensing means, for example a tube 29 on the downstream side of coil 3, to sense air pressure on that side of the filter zone. Pressure switch 27 is operated in response to selected increase in differential pressure between the upstream and downstream sides of the filter zone to operate a signal light 31 which indicates when the filter media web 9 is dirty and should be changed. In accordance with the present invention an arrangement is provided where switch 27 is actuated at a selected differential pressure and is reset to turn the indicator light off when the media is changed. In the example of the figures the switch is reset in response to a zero differential pressure. Therefore, the switch operates in response to a large, easily measured, change in differential pressure, i.e., between the selected differential pressure where the signal light is energized and "0" differential pressure and not in response to the slight change of differential pressure normally associated with air flow through a dirty filter and a clean filter.

In accordance with the example of the present invention shown in the figures the pressure differential is returned to zero to reset switch 27 by terminating air flow during a portion of the time new media 9 is introduced to the air filter zone. In the example shown in the figures a filter media advance control assembly 36, as shown in enlarged view in FIG. 2, is provided to actuate a switch 35 which selectively operates the fan motor 13 as hereinafter described.

Switch 35 is advantageously a single pole, double throw switch operated by movement of lever 37 with means to alternately actuate contacts 35a, 35b (FIG. 4) in response to successive actuating movement of the switch during each rotation of a gear wheel 39. Gear wheel 39 includes a contactor 38 disposed to strike lever 37 during each rotation of the gear wheel where gear wheel 39 is rotated by a complementary gear 52 which is, in turn, rotated in response to a movement of filter media 9 from filter media supply roll 4 to filter media takeup roll 8 by means of the drive assembly shown in exploded view in FIG. 3.

Figure 3:
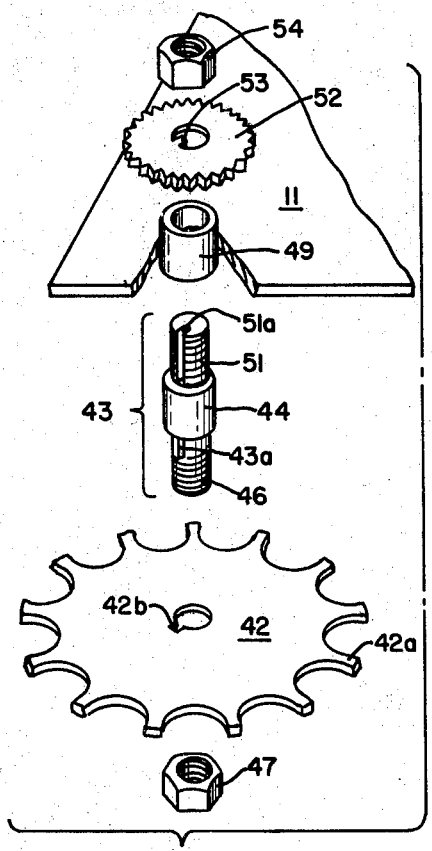
FIG. 3 is an exploded view of an example of an arrangement for sensing the advance of filter media through the air filtering zone; and, FIG. 4 is a series of schematic diagrams to illustrate the sequential steps of a control circuit which can be used in an apparatus in accordance with the present invention.

As shown in FIGS. 2 and 3 the drive assembly includes a star wheel 42 and a gear wheel 52 mounted on opposite ends of a spindle 43 which extends through a wall of filter frame 11. The elements of the assembly are interlocked as shown so star wheel 42 and gear wheel 52 are rotated together and star wheel 42 is disposed with points 42a of the star wheel in contact with media web 9 so the star wheel is rotated by movement of the media. In the example shown, dirty media 9 is drawn from the air filtering zone and wound on takeup roll 8 so that, in the view shown, movement of the media web rotates star wheel 42 in a counter-clockwise direction.

As shown in FIG. 3, star wheel 42 can be mounted on a spindle 43 and includes a slot 42b adapted to receive a key 43a of the spindle. Spindle 42 includes an enlarged spacer section 44 to define a shoulder which, advantageously, abuts wheel 42. An end 46 of spindle 43 is threaded to receive a nut 47 to retain star wheel 42 on shaft 43. A bushing 49 is inserted in the aperture in frame 11 and adapted to receive the spacer portion 44 when spindle 43 is inserted through the bushing. The second end 51 of spindle 43 is threaded to receive gear wheel 52 and is likewise threaded to receive a nut 54 to retain a gear wheel 52 on spindle 43. As shown, gear wheel 52 includes a key 53 to be received by a keyway 51a of the threaded portion of the spindle and the configuration of gear 52 is determined by the desired operating characteristics of the apparatus and the configuration of gear 39.

The air tempering coil 3 disposed downstream of air filter 9 can be of the extended surface type and can be provided with a selected tempering medium by means of inlet 6 and outlet 7 to impart a selected temperature change to the air stream flowing through the apparatus.

Figure 4:
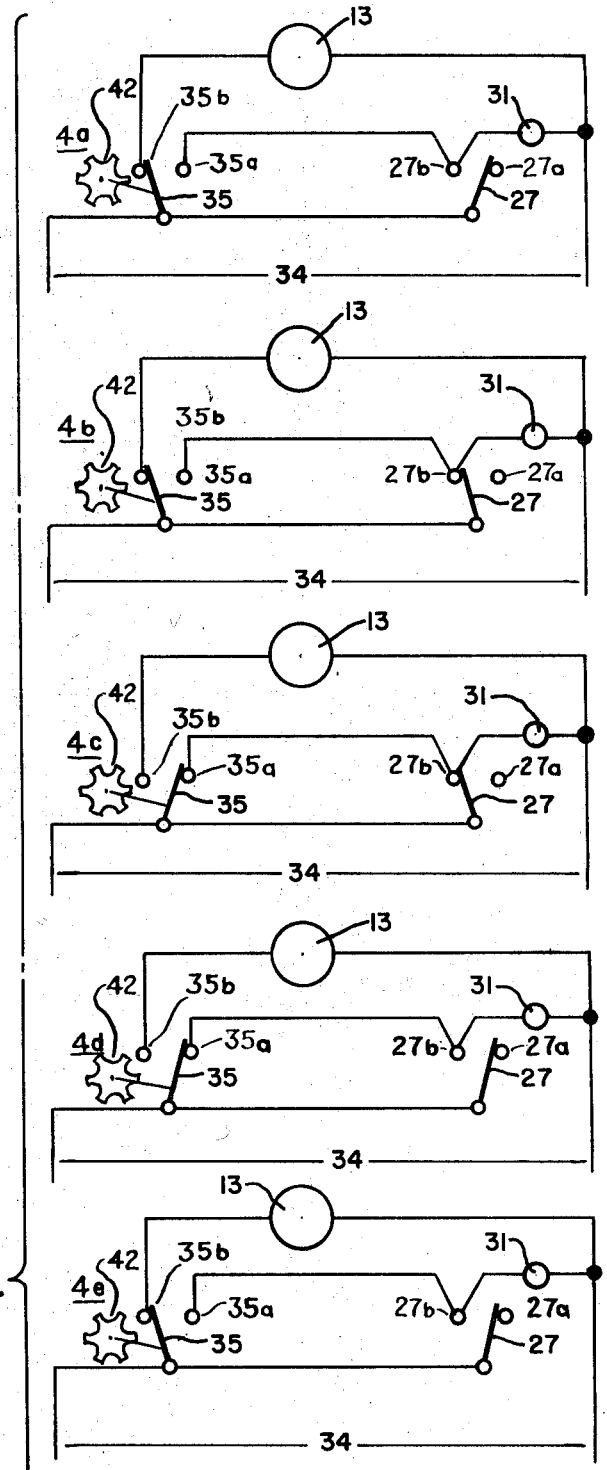

Operation of the apparatus of the example shown in the figures will be described with reference to FIGS. 1, 2, and 4, where FIG. 4 is a series of schematic illustrations of an electrical circuit which can be used in the apparatus of FIG. 1.

FIG. 4a illustrates, schematically, the position of the circuit elements when motor 13 is in operation and switch 35 is closed on contact 35b so motor 13 is energized from power supply 34. Switch 27, which is actuated by differential pressure across the filtering zone, is open on contact 27a so the portion of the circuit which includes light 31 is not energized and the light is off. As hereinbefore described, all of the air drawn into housing 1 passes through filter media web 9 for removal of particulate matter carried by the air stream. Accumulation of particulate matter and dirt on filter media 9 restricts air flow through the media and increases the differential pressure across the apparatus. Eventually, the differential pressure is sufficient to actuate switch 27 to closed position on contact 27b, as indicated in FIG. 4b, to energize light 31 and indicate that a filter media change is necessary.

The media is changed by inserting a crank through an opening (not shown) in housing 1 so the crank engages slot 23 of spindle 22. The crank is rotated to withdraw filter media from the filter zone so new media is supplied to the zone from roll 4. Movement of the media rotates star wheel 42 and gear 52, as hereinafter described, in a counter-clockwise direction to rotate gear 39 in a clockwise direction.

During normal operation, between media changes contact 38 is in contact with trip lever 37 so, as shown in FIG. 4a, switch 35 is closed on contact 35b. Rotation of gear 39 in response to movement of media web 9 moves contactor 38 off trip lever 37 so switch 35 closes on contact 35a to open the motor circuit and close a second circuit which connects light 31 to power supply circuit 34. When switch 35 opens contact 35b the power supply to motor 13 is terminated and air flow through the housing 1 ceases. Upon termination of the air flow the differential pressure across filter media web 9 is then reduced to zero to reset switch 27 as shown in FIG. 4d. Circuit 35a remains closed so indicator light 31 continues to burn and indicates that a full media change has not been accomplished.

Upon continued rotation of star wheel 42 contactor 38 once again trips lever 37 so, as shown in FIG. 4e, switch 35 is closed on contact 35b to initiate operation of motor 13 and simultaneously opens the circuit 35a to de-energize light 31 indicating a complete filter change has been accomplished.

It will be understood that gear wheels 52 and 39 can be selected to provide for the rotation of gear 39 in response to a selected number of rotations of gear 52 and star wheel 42 so that by proper selection of gears 52 and 39 a selected length of filter media 9 can be withdrawn from the filtering zone during a filter change.

The invention claimed is:

1. In an air handling unit having air supply means to provide a stream of air through said unit, means to retain filter media in air filtering relation in an air filtering zone in said unit to filter air passed through said unit, clean filter media supply means, and dirty filter media takeup means, a filter condition indicator and filter media advance control arrangement comprising: differential pressure sensing means sensitive to change in differential air pressure between the upstream and downstream side of said filter media; pressure differential indicator means actuated by said pressure sensing means in response to selected increase in differential air pressure across the filter media; means to supply clean filter media from said filter media supply means into said air filtering zone to said filter media takeup means; and means to terminate operation of said air supply means in response to advance of filter media into said filtering zone which includes wheel means contacting said filter media to be rotated by advance of said filter media through said air filter zone, said wheel means initiating operation of said air supply means when filter media has been supplied to said air filter zone and deactuating said pressure differential indicator means.

2. The apparatus of claim 1 wherein said air filter supply means and said air filter takeup means include a filter media supply roll and a filter media takeup roll disposed on opposite sides of said air filtering zone so a web of filter media extends through said air filtering zone from said air filter supply roll to said media takeup roll and clean filter media is advanced from said filter supply roll to said air filter zone and used filter media is removed from said air filter zone to said media takeup roll.

3. The air filter control apparatus of claim 2 wherein said pressure differential indicator means includes a light means actuated by said differential pressure sensing means in response to selected increase in differential pressure across said filter media.

4. In an air handling unit having air supply means to provide flow of air through said unit, means to retain filter media in air filtering relation in an air filtering zone in said unit, clean filter media supply means and dirty filter media takeup means, a filter media condition indicator and filter media advance control circuit comprising: differential pressure sensing means communicating with the air stream flowing through said unit and sensitive to change in differential pressure between the upstream and downstream sides of said filter media; a first power supply circuit connected to a source of electrical power and having a first switch operable by said differential pressure sensing means between a first open position in response to selected decrease in differential pressure and a second closed position in response to selected increase in differential pressure sensed by said differential pressure sensing means; light means in said first circuit to be energized when said switch is in said second closed position; second power supply circuit connected to said source of power having a second switch operable between a first closed position to operate said air supply means and a second closed position to terminate operation of said air supply means and energize said light means; means to advance filter media from said filter media supply means into said air filtering zone and advance filter media from said air filtering zone to said filter media takeup means; means to sense the length of filter media advanced through said filtering zone including wheel means disposed to contact said filter media and be rotated by movement of said filter media; means to operate said second switch means from said first closed position to said second closed position in response to selected rotation of said wheel means; means to move said first switch from said second position to said first position in response to selected decrease in differential pressure between said upstream and downstream side of said filter media; and, means to actuate said second switch means from said second position to said first position in response to second selected number of rotations of said wheel means.

References Cited
UNITED STATES PATENTS

| | | | |
|---|---|---|---|
| 2,119,978 | 6/1938 | Wolthuis et al. | 55—354 |
| 2,626,012 | 1/1953 | Persons | 55—213 |
| 2,807,330 | 9/1957 | Rivers | 55—354X |
| 2,848,064 | 8/1958 | Gregory et al. | 55—352X |
| 2,927,659 | 3/1960 | Pabst et al. | 55—274X |
| 3,310,931 | 3/1967 | Revell | 55—354 |

DENNIS E. TALBERT, JR., Primary Examiner

U.S. Cl. X.R.

55—268, 352, 354, 467; 210—387